(12) United States Patent
Tanaka et al.

(10) Patent No.: US 6,202,780 B1
(45) Date of Patent: Mar. 20, 2001

(54) CRUISE CONTROL SYSTEM FOR MOTOR VEHICLE

(75) Inventors: Hiroyuki Tanaka, Tachikawa; Toshiaki Tateno, Yokohama; Masatoshi Otani, Tokyo, all of (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/128,478

(22) Filed: Aug. 4, 1998

(30) Foreign Application Priority Data

Aug. 4, 1997 (JP) .................................................. 9-209502

(51) Int. Cl.$^7$ .................................................. B60K 31/04
(52) U.S. Cl. .................................... 180/179; 74/3; 701/93
(58) Field of Search ................................. 701/93, 51, 95; 74/3, 2; 180/170, 179, 178, 176

(56) References Cited

U.S. PATENT DOCUMENTS

| 4,933,859 | * | 6/1990 | Tsuyama et al. ................. 180/179 X |
| 5,038,880 | * | 8/1991 | Matsuoka et al. .................... 180/179 |
| 5,285,865 | * | 2/1994 | Sakita ..................................... 180/179 |
| 5,544,056 | * | 8/1996 | Seireg et al. ...................... 180/179 X |
| 5,680,309 | * | 10/1997 | Rauznitz et al. ................. 180/170 X |
| 5,758,306 | * | 5/1998 | Nakamura ................................. 701/93 |
| 5,799,262 | * | 8/1998 | Suzuki ............................. 180/179 X |

FOREIGN PATENT DOCUMENTS 8-193656A    7/1996 (JP) .

* cited by examiner

*Primary Examiner*—Michael Mar

(57) ABSTRACT

A motor vehicle is provided with an automatic transmission including a shift manipulating device having an automatic shift position and a manual shift position, and a shift control device which places the automatic transmission in an optimum gear position when the shift manipulating device is operated to the automatic shift position, and places the transmission in a desired gear position according to a shift command operation by a driver when the shift manipulating device is operated to the manual shift position. The cruise control system includes a target speed setting device which sets a target speed to which a vehicle speed is controlled under constant-speed cruise control, a vehicle speed sensor which detects a vehicle speed, a constant-speed cruise control device which controls an engine of the vehicle so that the vehicle speed detected by the vehicle sensor becomes equal to the target vehicle speed set by the target vehicle speed setting device, and a canceling device which cancels an operation of the constant-speed cruise control device means when the shift manipulating device is operated from the automatic shift position to the manual shift position, and the transmission is shifted to a different gear position, while the vehicle is running under constant-speed cruise control.

13 Claims, 5 Drawing Sheets

CRUISE CONTROL SYSTEM FOR MOTOR VEHICLE

FIELD OF THE INVENTION

The present invention relates to a cruise control system for a motor vehicle, which performs a constant-speed cruise control of the motor vehicle.

BACKGROUND OF THE INVENTION

With an increasing demand for making it easy and automated to operate a driving apparatus, such as an automotive vehicle, a transmission system has been automated, and a constant-speed cruise control system for enabling the driving apparatus to travel at a constant speed has been developed.

In general, the cruise control system performs constant-speed cruise control by setting a target vehicle speed to a vehicle speed detected at the time when a cruise control set switch is turned on, and controlling the vehicle so as to maintain the target vehicle speed.

Since a gear position or shift position of the transmission needs to be changed in some cases so as to keep the vehicle running at a constant speed, the cruise control system is required not only to control the engine output, but also control changes of the gear position of the transmission. To this end, the cruise control system is provided with an automatic shift device for changing the gear position to the one suitable for the current vehicle running condition, so as to maintain the target vehicle speed.

The cruise control device, as described above, is also adapted to cancel constant-speed cruise control when the driver steps on a footbrake or brake pedal, for example In the conventional cruise control system, as described above, however, the constant-speed cruise control is not canceled when the driver selects a manual shift mode, and manually carry out a shifting operation. For example, the vehicle speed preset for the cruise control is undesirably maintained even where the driver manipulates a change lever so as to shift down the transmission so that the vehicle speed is reduced due to an effect of an engine brake.

In view of the above problem, Japanese laid-open Patent Publication No. 8-193656 discloses a technique for ignoring a shift command from a cruise control ECU when the manual shift mode is selected in an automatic transmission equipped with a manual shifting function. the manual shift mode is selected, however, only the shift command generated under the cruise control is ignored, and constant-speed cruise control is still continued or maintained, and therefore the vehicle speed cannot be reduced unless the brake pedal is depressed by the driver so that the cruise control is canceled.

Namely, if the constant-speed cruise control is kept effective even after the manual shift mode is selected and a shift command for upshifting or downshifting is generated, the vehicle speed preset for the cruise control is maintained even where the driver attempts to reduce the vehicle speed only by use of the engine brake, by shifting down the transmission without using the brake pedal. In this case, the vehicle speed cannot be reduced as desired.

SUMMARY OF THE INVENTION

It is, therefore, an object of the present invention to provide a cruise control system for a motor vehicle, wherein the vehicle speed can be reduced due to an effect of an engine brake which results from a shifting operation of an automatic transmission, even while the vehicle is running under constant-speed cruise control.

To accomplish the above object, the present invention provides a cruise control system for a motor vehicle, which includes: shift manipulating means for establishing a selected one of an automatic shift mode in which an optimum gear position of an automatic transmission is automatically set according to a running condition of the vehicle, and a manual shift mode in which a gear position of the automatic transmission is allowed to be changed according to a shift command operation of a driver; shift control means for changing the gear position of the automatic transmission based on an operated state of the shifting means; target speed setting means for setting a target speed to which a vehicle speed is controlled under cruise control; actual vehicle speed detecting means for detecting an actual vehicle speed of the motor vehicle; constant-speed cruise control means for controlling an engine of the vehicle so that the actual vehicle speed detected by the actual vehicle speed setting means becomes equal to the target vehicle speed set by the target vehicle speed setting means; and canceling means for canceling an operation of the constant-speed cruise control means when the shift manipulating means is operated to switch from the automatic shift mode to the manual shift mode, and the shift command operation is performed by the driver, while the vehicle is running under constant-speed cruise control.

The present invention also provide a cruise control system for a motor vehicle, comprising:

an automatic transmission including a shift manipulating device having an automatic shift position and a manual shift position, and a shift control device which places the automatic transmission in an optimum gear position when the shift manipulating device is operated to the automatic shift position, the optimum gear position being selected from a plurality of gear positions, according to an operated state of an accelerator pedal by a driver and a running condition of the vehicle, the shift control device placing the automatic transmission in a desired gear position according to a shift command operation by a driver when the shift manipulating device is operated to the manual shift position; a target speed setting device which sets a target speed to which a vehicle speed is controlled under constant-speed cruise control; a vehicle speed sensor which detects a vehicle speed of the motor vehicle; a constant-speed cruise control device which controls an engine of the vehicle so that the vehicle speed detected by the vehicle sensor becomes equal to the target vehicle speed set by the target vehicle speed setting device; and a canceling device which cancels an operation of the constant-speed cruise control device means when the shift manipulating device is operated from the automatic shift position to the manual shift position, and the transmission is shifted to another gear position, while the vehicle is running under constant-speed cruise control performed by the constant-speed cruise control means.

BRIEF DESCRIPTION OF THE DRAWINGS

The present invention will be described in greater detail with reference to a preferred embodiment thereof and the accompanying drawings, which are given by way of illustration only, and thus arc not limitative of the present invention, and wherein.

DETAILED DESCRIPTION OF THE PREFERRED EMBODIMENTS

A cruise control system for a motor vehicle according to one preferred embodiment of the present invention will be described in detail with reference to the drawings.

The cruise control system of the present embodiment is suitably used in a motor vehicle equipped with a semi-automatic transmission system which may operate in a selected one of a manual shift mode, and an automatic shift mode in which the transmission is automatically shifted to an optimum gear position. In the manual shift mode, a shift command, generated by a manual operation for changing the gear position of the transmission, is transmitted as an electric signal to a gear shift actuator, so that the gear shift actuator can operate to shift the transmission as desired under remote control. First, the semi-automatic transmission system will be described.

Figure 2:
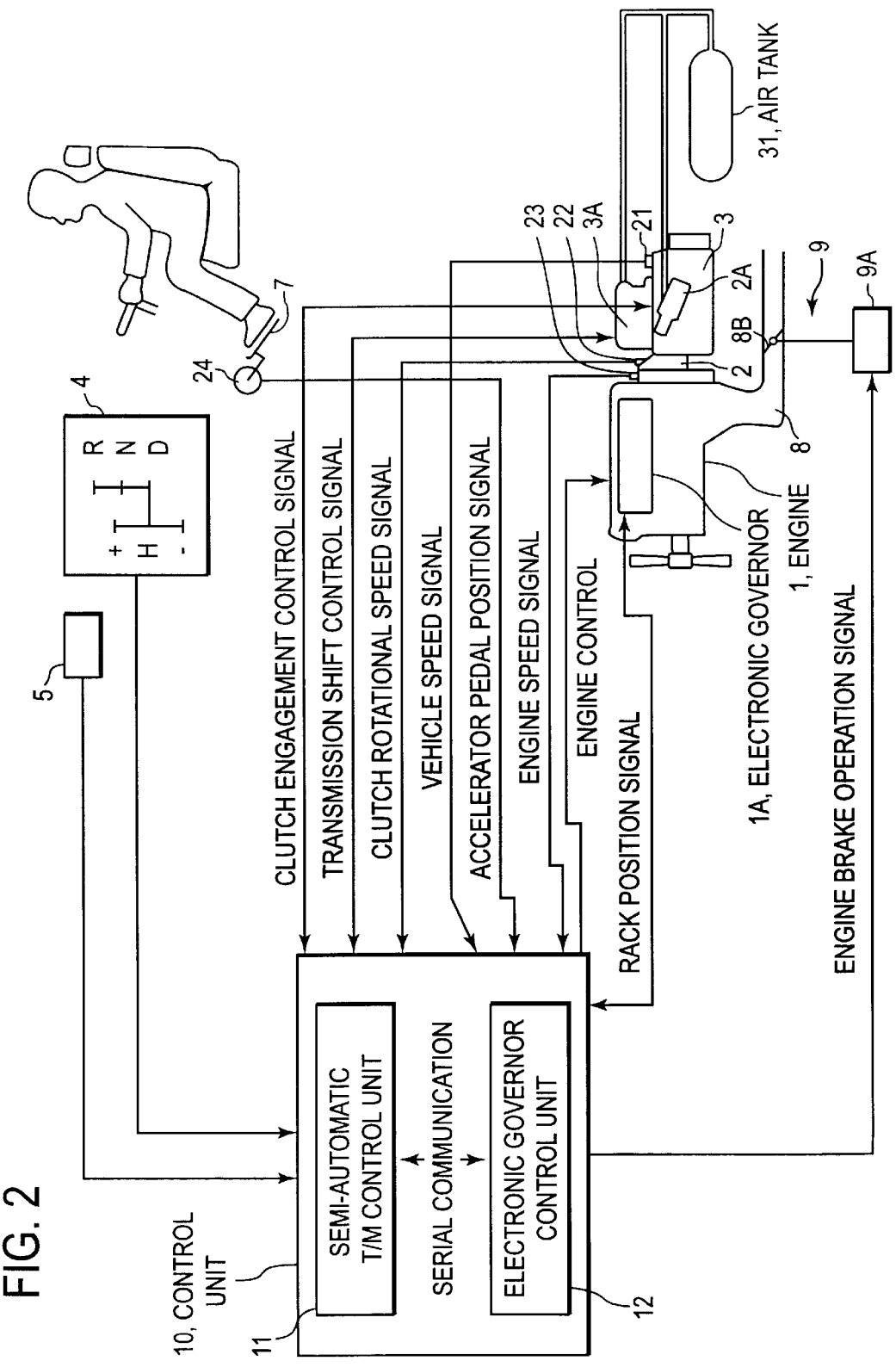
FIG. 2 is a block diagram schematically showing the whole construction of the vehicle cruise control system of the embodiment of FIG. 1.

Referring to FIG. 2, the semi-automatic transmission system is installed for use with a diesel engine I installed in a motor vehicle, such as a truck or a bus, and includes a clutch mechanism 2 attached to an output portion of the engine 1, a semiautomatic transmission 3, and a control unit 10 that includes a semi-automatic transmission control unit (semi-automatic T/M control unit) 1 for controlling the operation of the semi-automatic transmission 3, and an electronic governor control unit 12 for controlling the operation of the engine 1.

The clutch mechanism 2 is provided with a clutch booster 2A which functions as a clutch actuator. The clutch booster 2A drives the clutch mechanism 2 for engagement or disengagement thereof, depending upon the amount of air supplied from an air tank 31.

The semi-automatic transmission 3 has seven forward, and one reverse gear positions, for example, and is provided with a gear shift unit (GSU) 3A serving as a gear shift actuator. The gear shift unit 3A is adapted to place the semi-automatic transmission 3 in a desired gear position by shifting gears in a gear mechanism of the transmission 3.

The clutch booster 2A, gear shift unit 3A, and the electronic governor 1A are controlled by the semi-automatic T/M control unit 11 and electronic governor control unit 12 of the control unit 10, with electronic signals supplied from the control units 11, 12.

To the semi-automatic T/M control unit (shift control means) 11, there are connected a change lever unit 4 serving as shift manipulating means, a cruise control set switch 5 for setting a target vehicle speed for constant-speed cruise control, a transmission gear-position sensor (not illustrated) for detecting a current gear position of the semi-automatic transmission 3, a clutch speed sensor 22 for detecting the rotating speed of the clutch (namely, the speed of rotation of an output shaft of the clutch mechanism 2), and the electronic governor control unit 12.

To the electronic governor control unit 12, there are connected a vehicle speed sensor (actual vehicle speed detecting means) 21 for detecting the actual vehicle speed of the motor vehicle, an accelerator pedal position sensor 24 attached to an accelerator pedal 7, for detecting the amount of depression of the accelerator pedal 7, an engine speed sensor 23 for detecting a signal indicative of the speed of rotation of the output shaft of the engine 1. The electronic governor 1A, exhaust brake unit 9A, and the semi-automatic T/M control unit 11 are also connected to the electronic governor control unit 12.

As shown in FIG. 2, the change lever unit 4 has an I-shaped shift pattern having six shift positions, i.e., N (neutral), R (reverse), D (drive), H (hold), +(shift-up), −(shift-down) positions.

When the D position is selected, namely, when the driver operates the change lever to the D position, the transmission system is placed in the automatic shift mode. When the H position is selected, the transmission system is placed in the manual shift mode, and the current gear position is held or maintained in this mode. The H position may also be called "M (manual) position" since the manual shift mode is established when the change lever is operated to the H position. If the change lever is moved upward to the +position, an upshift command is generated, and if the change lever is moved downward to the −position, a downshift command is generated.

The clutch mechanism 2 is constructed so that the clutch can be engaged or disengaged by a driver's operation of a clutch pedal (not shown). When the vehicle is started, therefore, the driver operates the clutch pedal and the accelerator pedal 7, so as to enable a vehicle start operation as performed in a conventional manual transmission system. In this sense, the transmission system of the present embodiment is called "semi-automatic transmission system." After the start of the vehicle, however, the transmission may be automatically shifted only by the operation of the accelerator pedal, in the same manner as in a conventional automatic transmission.

The motor vehicle equipped with the semi-automatic transmission system, as described above, is also provided with an exhaust brake (auxiliary brake) 9 which includes an exhaust valve 8B disposed in an exhaust passage 8. The exhaust brake 9 is controlled by an exhaust brake unit (auxiliary brake actuating means) which receives an electric signal based on various information from the electronic governor control unit 12.

The exhaust brake 9 is also actuated in response to a signal from an exhaust brake switch 27 (FIG. 1), which is supplied to the brake 9 via the exhaust brake unit 9A.

The vehicle cruise control system according to the present embodiment will be now described.

To perform the constant-speed cruise control, the vehicle cruise control system controls a fuel supply system of the diesel engine by means of the electronic governor 1A so as to control the output of the engine, and also controls changes of the gear position of the semi-automatic transmission 3 and the operation of the exhaust brake 9 as an auxiliary brake.

Figure 1:
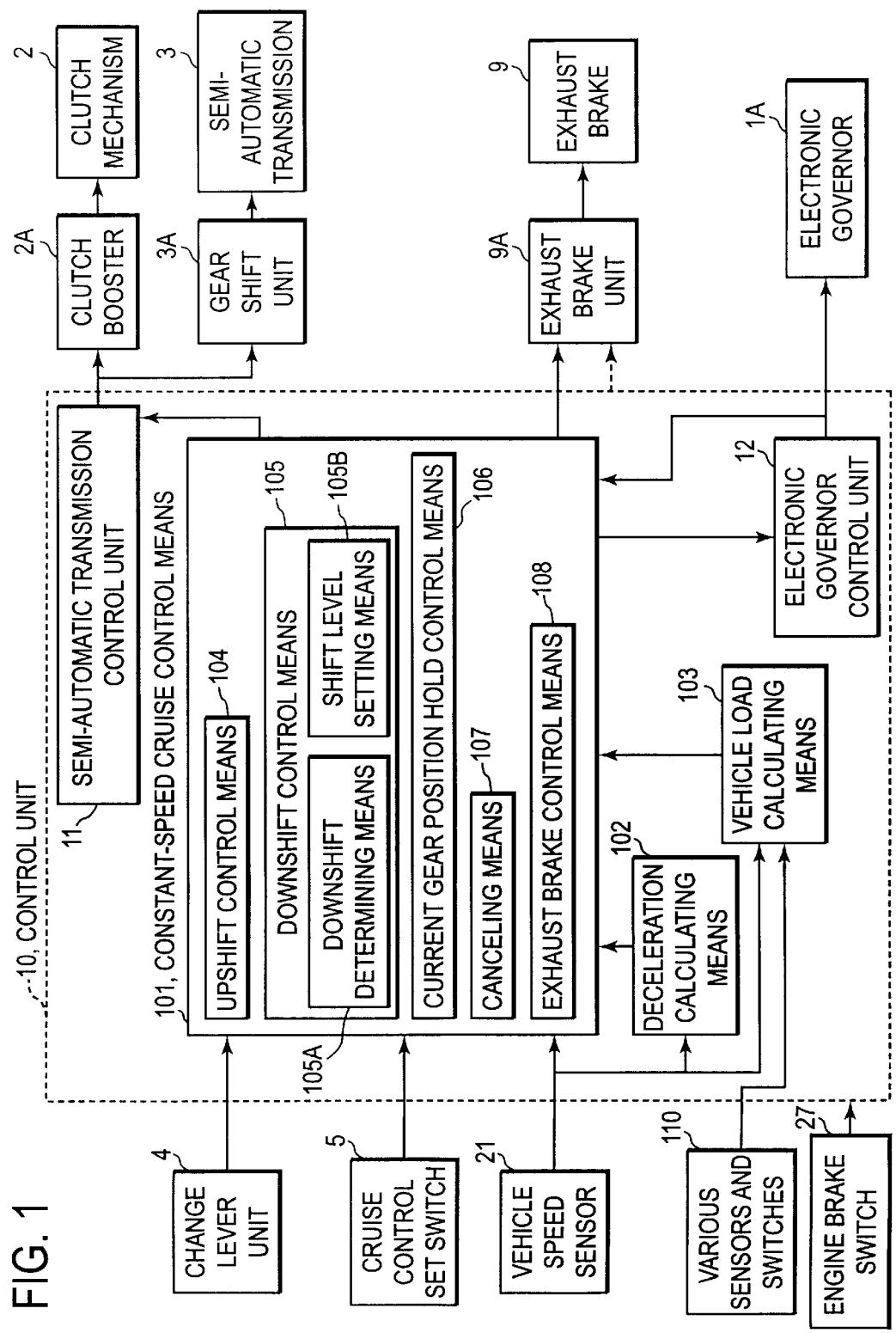
FIG. 1 is a block diagram schematically showing the construction of a principal part of a cruise control system for a motor vehicle according to one embodiment of the present invention.

As shown in FIG. 1, the vehicle cruise control system includes a cruise control set switch 5 serving as target speed setting means, constant-speed cruise control means 101, deceleration calculating means 102, and vehicle load calculating means 103. The clutch booster 2A and the gear shift unit 3A are controlled by the semi-automatic T/M control unit 11, and the electronic governor 1A is controlled by the electronic governor control unit 12, while the exhaust brake 9 is controlled by the exhaust brake unit 9A. The semi-automatic T/M control unit 11, electronic governor control unit 12, and the exhaust brake unit 9A receive control signals or commands from the constant-speed cruise control means 101. In this manner, the cruise control system of the present embodiment performs the constant-speed cruise control or automatic speed control of the vehicle so that the vehicle runs at a target vehicle speed which is set to a vehicle speed that is detected when the cruise control set switch 5 is turned on.

The cruise control set switch 5 functions to initiate or establish constant-speed cruise control. Namely, the cruise control is initiated when the set switch 5 is turned on, and the constant speed (target vehicle speed) at which the vehicle is supposed to run under cruise control is set to the vehicle speed at which the vehicle is running when the switch 5 is turned on. This target vehicle speed is output to the constant-speed cruise control means 101. When the cruise control set switch 5 is turned off, the cruise control is canceled.

The constant-speed cruise control means 101 generates a command to the semi-automatic transmission control unit 11 to change the gear position of the transmission 3, and generates a command to the electronic governor 1A as fuel supply means, to control the output of the engine, so that the actual vehicle speed detected by the vehicle speed sensor 21 becomes close to the target vehicle speed set by the target speed setting means 5. Details of this operation will be described later.

The deceleration calculating means 102 calculates a deceleration (negative acceleration) of the vehicle based on the vehicle speed detected by the vehicle speed sensor 21, and outputs the thus calculated deceleration to the constant-speed cruise control means 101.

The vehicle load calculating means 103 calculates a load condition of the vehicle as a vehicle load, based on information received from the vehicle speed sensor 21, and various sensors and switches 110, and outputs the thus calculated vehicle load to the constant-speed cruise control means 101.

Figure 3:
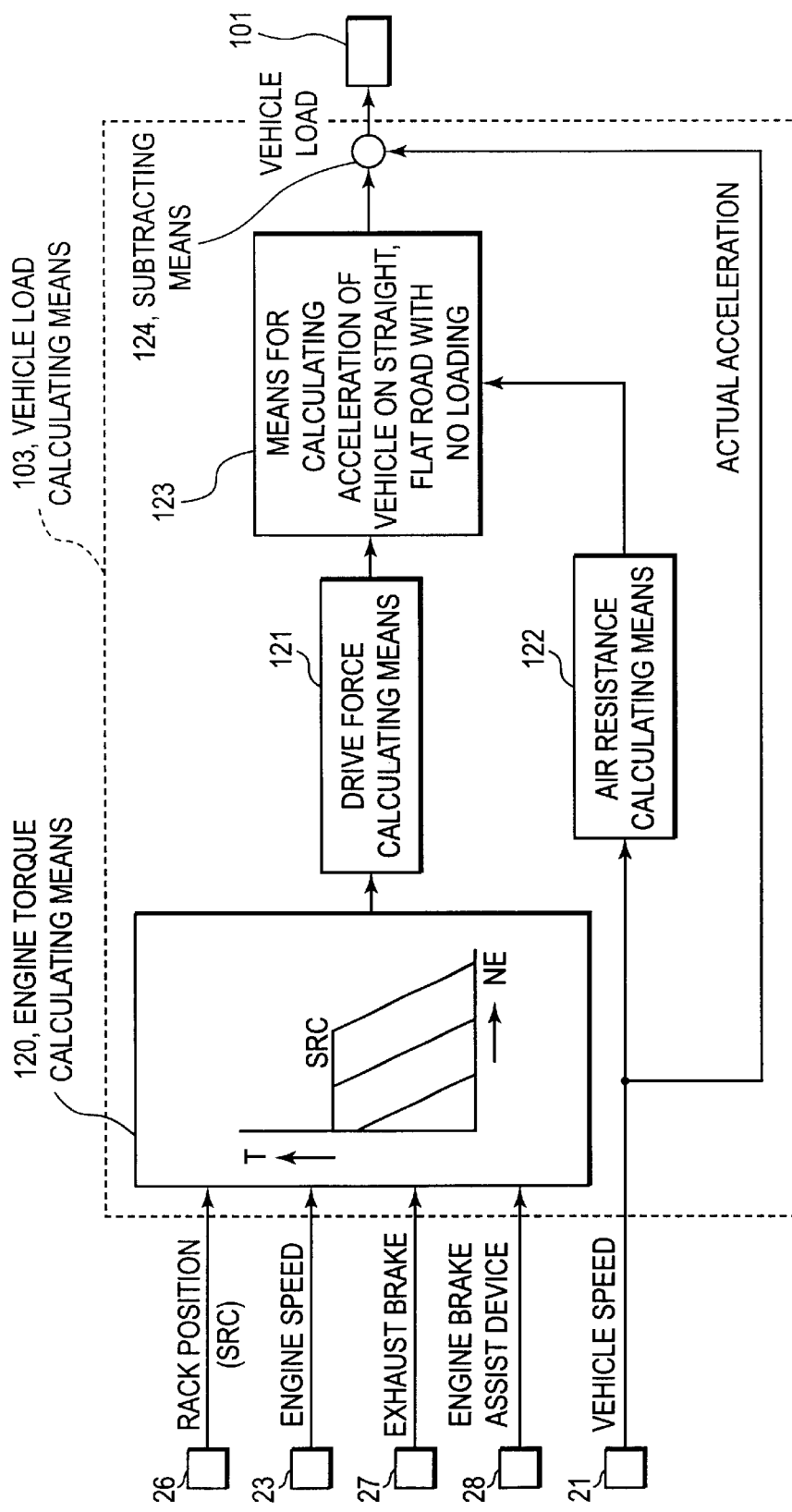
FIG. 3 is a block diagram schematically showing the construction of a principal part of vehicle load calculating means of the vehicle cruise control system of the embodiment of FIG. 1.

As shown in FIG. 3, the vehicle load calculating means 103 includes engine torque calculating means 120, driving force calculating means 121, air resistance calculating means 122, and acceleration calculating means 123 for calculating an acceleration of the vehicle when traveling on a straight, flat road with no load (no passenger and no cargo) on the vehicle, and subtracting means 124. The vehicle load calculating means 103 thus constructed is adapted to calculate an amount of the load on the vehicle, based on a difference between an actual acceleration of the vehicle, and a theoretical acceleration of the vehicle when it runs on a flat road with no loading, which acceleration is determined based on the amount of the fuel injected into the engine.

The engine torque calculating means 120 serves to calculate the engine torque T. As shown in FIG. 3, the engine torque is obtained from a map, based on position information (engine output command information) SRC received from a rack position sensor 26 for detecting the position of a control rack (not illustrated), and engine speed information NE received from the engine speed sensor 23.

The driving force calculating means 121 calculates the driving force F of the vehicle, based on the engine torque r obtained by the engine torque calculating means 120.

The air resistance calculating means 122 calculates air resistance R1 as running resistance of the vehicle, based on the actual vehicle speed information V.

The acceleration calculating means 123 calculates an acceleration of the vehicle in the case where it is accelerated on a straight, flat road with no passenger and no cargo being loaded on it, based on the driving force information F calculated by the above-indicated driving force calculating means 121, and the air resistance information R1 calculated by the air resistance calculating means 122. The acceleration $\alpha_0$ under the above conditions is calculated according to the expression as follows:

$$\alpha_0 = g \cdot [F - (\mu W_0 + R1)]/(W_0 + W_r),$$

where g is gravity, $\mu$ is coefficient of friction of a road surface, $W_0$ is weight of a vehicle with no loading on it, and $W_r$ is weight of a rotating portion of the vehicle.

The subtracting means 124 calculates load information $\alpha_{VL}$ of the vehicle based on the acceleration information $\alpha_0$ of the vehicle running on a flat road with no load, which is calculated by the acceleration calculating means 123, and actual acceleration information $\alpha$ received from the vehicle speed sensor 21.

$$\alpha_{VL} = \alpha_0 - \alpha$$

It is thus possible to determine or judge how large (or small) the vehicle load is, from the value of $\alpha_{VL}$ obtained by the subtracting means 124. With this information, the timing of upshifting can be changed depending upon the load condition of the vehicle or the running state of the vehicle on uphill and downhill loads, assuring an improved fuel economy while maintaining high running performance.

Next, the constant-speed cruise control means 101 will be described in detail.

As shown in FIG. 1, the constant-speed cruise control means 101 includes upshift control means 104, downshift control means 104, current gear hold control means 106, canceling means 107, and exhaust brake control means 108 as auxiliary brake control means. The thus constructed cruise control means 101 is adapted to select an optimum gear position of the transmission so as to achieve a high fuel efficiency, while maintaining the preset vehicle speed through automatic downshifting.

The upshift control means 104 determines whether the transmission can be shifted up to the next (higher) gear position, so that the vehicle runs in the highest possible gear position so as to achieve a high fuel efficiency. If the vehicle runs in a suitable manner in the gear position higher than the current gear, the control means 104 sets a target gear position to which the transmission is to be shifted up.

To this end, the upshift control means 104 determines whether the following conditions are satisfied, and, if all of the conditions are satisfied, the control means 104 determines that the transmission can be shifted up to the target gear position.

(1) The vehicle load calculated by the vehicle load calculating means 103 is equal to or less than a predetermined load $\alpha_{VL}$ (vehicle load $\leq$ predetermined load $\alpha_{VL}$).

This condition needs to be satisfied in view of the following situation. The fuel efficiency deteriorates if the vehicle is kept running in a low-speed gear position, even though the vehicle load is small and the vehicle is able to run suitably in a gear position one shift level higher than the current lower-speed gear position. Thus, the upshift control means 104 observes the amount of the vehicle load calculated in view of the vehicle load condition of the vehicle, gradient or slope of the traveling road, and so on, and permits upshifting of the transmission when the vehicle load in the current gear position is sufficiently small.

In the above arrangement, in which the transmission is shifted up depending upon the load condition of the vehicle, even where setting of the target vehicle speed occurs while the vehicle is traveling on an uphill road, for example, the transmission may be shifted up when the vehicle leaves the uphill road and now travels on a flat load, with a result of reduction in the vehicle load. Thus, the transmission can be placed in the optimum gear position, and the fuel economy can be improved.

(2) The actual vehicle speed detected by the vehicle sensor 21 is in the neighborhood of the target vehicle speed that is set by turning on the cruise control set switch 5. Namely, the actual vehicle speed is equal to or greater than a value obtained by subtracting a predetermined vehicle speed CPU from the target vehicle speed (actual vehicle speed≧target vehicle speed−predetermined vehicle speed CPU).

This condition is established so that the transmission is allowed to be shifted up after the actual vehicle speed becomes sufficiently close to the target vehicle speed, so as to prevent shift hunting due to reduction in the vehicle speed during shifting. The predetermined vehicle speed CRU is set to be lower than a predetermined vehicle speed CRD as described later.

If it is determined that the transmission can be shifted up, namely, if the above conditions are satisfied, the upshift control means 104 sets the target gear position to a gear position that is one shift level higher than the current gear position (target gear position←current gear position+1 shift level).

When the vehicle speed is increasing after the downshift control means 105, as described later, shifts down the transmission to a gear position that is two or more shift levels lower than the current gear position, the transmission may be shifted up so that the vehicle speed reaches the target vehicle speed while avoiding reduction of the fuel efficiency. To this end, it is determined whether the following condition is satisfied or not, and, if this condition is satisfied, the upshift control means 104 determines that the transmission can be shifted up to an appropriate gear position.

(3) The engine speed detected by the engine speed sensor 23 is equal to or greater than a predetermined value (NEV) (engine speed≧predetermined value (NEV).

This condition needs to be satisfied in view of the following situation. When the target vehicle speed is set while the vehicle is running on a road other than an uphill road, and the vehicle speed then becomes lower than the target vehicle speed as the vehicle now travels on an uphill road (namely, as the deceleration of the vehicle becomes large), the transmission is shifted down to a gear position two or more shift levels lower than the current gear position, to increase the vehicle speed toward the target speed. Subsequently, the transmission is shifted up to one higher gear position before the engine speed is excessively increased due to the greatly lowered gear position.

The downshift control means 105 serves to establish a target gear position to which the transmission is shifted down in the case where a driving force that is larger than the driving force obtained in the current gear position is required to maintain the vehicle speed.

When a large driving force is needed as the vehicle is running on an uphill road, for example, and it is difficult to maintain the vehicle speed if the vehicle runs while keeping the same gear position as used for flat road traveling, the downshift control means 105 generates a command to shift down the transmission, thereby to recover the driving force and maintain the desired vehicle speed.

To achieve the above purpose, the downshift control means 105 includes downshift determining means 105A and gear-position setting means 105B.

The downshift determining means 105A determines whether a driving force larger than the driving force obtained in the current gear is required to maintain the vehicle speed, and whether the transmission needs to be shifted down to provide the larger driving force. The downshift determining means IOSA determines that the larger driving force is required if all of the following conditions are satisfied.

(1) The actual vehicle speed detected by the vehicle speed sensor 21 is equal to or less than a value obtained by subtracting a predetermined vehicle speed CRD from the target vehicle speed set by the cruise control set switch 5 (actual vehicle speed≦target vehicle speed−predetermined vehicle speed CRD).

This condition needs to be satisfied in view of the following situation. Where the actual vehicle speed is reduced to be lower than the target vehicle speed by the predetermined vehicle speed CRD, it is difficult to accomplish a desired cruise control only by utilizing fuel injection control (rack control) of the electronic governor IA through the electronic governor control unit 12. In this connection, the predetermined vehicle speed CRD is set to be larger than the predetermined vehicle speed CRU indicated above.

(2) A rack position voltage that is set as an amount of control of the electronic governor 1A by the electronic governor control unit 12 is equal to or less than a predetermined voltage CRRD, namely, the amount of fuel injection is equal to or greater than a predetermined value (rack position voltage≦predetermined voltage CRRD).

This condition is set up so as to prevent the transmission from being shifted down when a desired result cannot be expected from the downshifting. When the rack position voltage is higher than the predetermined voltage, a sufficient amount of the fuel has been already injected by the electronic governor 1A, and it is therefore difficult to further increase the vehicle speed through the fuel injection control.

When the downshift determining means 105A determines that the transmission needs to be shifted down, the shift level setting means 105B sets or determines a shift level by which the transmission is shifted down, based on the magnitude of the deceleration of the vehicle. The shift level setting means 105B sets the downshift level to be proportional to the magnitude of the deceleration calculated by the deceleration calculating means 102.

By setting the shift level of downshifting in the above manner, a required driving force can be surely provided even when the vehicle is decelerated at a high rate, as in the case where the vehicle is running on an uphill having a considerably large gradient, or the vehicle carries an excessively large load. With this arrangement, the target vehicle speed set under constant-speed cruise control can be desirably maintained with even higher reliability.

The shift level setting means 105 determines whether the following condition is satisfied or not, and if this condition is satisfied, the setting means 104 determines that the transmission is to be shifted down by two shift levels corresponding to two gear positions.

The magnitude of the deceleration calculated by the deceleration calculating means 102 is equal to or greater than that of a predetermined deceleration αd2 (|deceleration|≧predetermined deceleration αd2|).

If this condition is not satisfied, the shift level setting means 105B determines whether the following condition is satisfied or not, and, if this condition is satisfied, the setting means 104 determines that the transmission is to be shifted down by one shift level corresponding to one gear position.

The magnitude of the deceleration obtained by the deceleration calculating means 102 is equal to or greater than that of a predetermined deceleration αd1 (|deceleration|≧|predetermined deceleration αd1|).

This condition is established for the reason as follows. Since the required amount of the driving force differs depending upon the load condition of the vehicle and the gradient of the road on which the vehicle travels, the load condition of the vehicle and the gradient of the traveling road are estimated from the magnitude of the deceleration of the vehicle, and the shift level of downshifting is determined based on the result of estimation.

By changing the downshift level depending upon the magnitude of the deceleration detected by the deceleration detecting means 102, the transmission is prevented from downshifting to an extent greater than required where the deceleration is relatively small. Since the shift level setting means 105B is able to set the shift level of downshifting to be proportional to the deceleration detected by the deceleration detecting means 102, the optimum downshift level can be established so as to control the vehicle speed back to the target vehicle speed.

The predetermined deceleration αd1 may be considered as a degree of deceleration for which the driving force can be recovered by one downshift level corresponding to one gear position. The predetermined deceleration αd2 may be considered as a degree of deceleration for which the driving force can be recovered by two downshift levels corresponding to two gear positions. Thus, the predetermined deceleration αd2 is set to be a value greater than the predetermined deceleration αd1.

When the transmission is shifted down by the shift level thus determined, an over run (excessively high-speed rotation) of the engine may occur in some cases. The downshift control means 105 determines whether downshifting by the shift level determined, as described above, will result in the over run or not.

If it is determined that the downshifting will not result in the over run, the downshift control means 105 sets a gear position which is one or two levels lower than the current gear position, as the target gear position.

More specifically, when the downshift level set by the shift level setting means 105 is one shift level corresponding to one gear position, the gear position which is one level lower than the current gear is set as the target gear position (target gear position←current gear position−1 shift level). If the downshift level set by the shift level setting means 105B is two shift levels, the gear position which is two levels lower than the current gear is set as the target gear position (target gear position←current gear position−two shift levels).

When the downshift control means determines that the downshifting by the shift level set by the shift level setting means 105B will result in the over run of the engine, the downshift level is reduced, and the target gear position is set to a gear position that is lower by the reduced level than the current gear position.

More specifically, where the downshift level set by the shift level setting means 105B is one level corresponding to one gear position, the shift control means 105 does not shift down the transmission. Where the downshift level set by the shift level setting means 105B is two levels corresponding to two gear positions, the downshift level is reduced from two levels to one level, and then it is determined whether downshifting by one shift level will not result in the over run of the engine. If it is determined that the over run will not occur, the target gear position is set to a gear position that is one level lower than the current gear (target gear position←current gear position−1 shift level). If it is determined that over run may occur, the downshifting will not be performed.

The current gear position hold control means 106 determines whether or not constant-speed cruise control is carried out by changing the gear position of the transmission as well as controlling the fuel supply of the electronic governor 1A. If the cruise control is not to be carried out by changing the gear position in addition to control of the fuel supply of the electronic governor 1A, the current gear hold control means 106 holds or maintains the current gear position. In this case, constant-speed cruise control is achieved only by performing the fuel supply control.

To accomplish the above purpose, the current gear hold control means 106 determines whether the change lever of the change lever unit 4 is placed in the H position that establishes the manual shift mode, or in the D position that establishes the automatic shift mode. If the change lever of the change lever unit 4 is placed in the H position, the gear position of the transmission is not changed, and the current gear is held or maintained. In this case, cruise control is accomplished only by controlling the fuel supply of the electronic governor 1A by means of the electronic governor control unit 12.

With the above arrangement, the driver is able to select one of two cruise control methods, i.e., cruise control performed by changing the gear position of the semi-automatic transmission 3 through the semi-automatic transmission control unit 11 as well as controlling the fuel supply of the electronic governor 1A, and cruise control performed only by controlling the fuel supply of the electronic governor 1A through the electronic governor control unit 12, depending upon whether the driver operates the change lever of the change lever unit 4 to the H position or to the D position. Thus, cruise control may be carried out in a selected method, by changing the gear position or not changing the gear position, depending upon a preference of the driver.

The canceling means 107 causes the constant-speed cruise control means 0 1 to cancel cruise control when the change lever of the change lever unit 4 is operated to one of the N position, R position +position, and −position (namely, when the change lever is not placed in the D position or H position).

As a result of the operation of the canceling means 107, the gear position of the transmission can be changed by a shifting operation with the change lever, and the vehicle speed can be controlled as desired according to the driver's intention. While the vehicle is being decelerated after high-speed running, for example, the constant-speed cruise control may be canceled by the canceling means 107, only by shifting down the transmission, without requiring the driver to step on a footbrake or brake pedal, so that the vehicle can be decelerated only due to an effect of an engine brake.

The exhaust brake control means 108 generates a command to the exhaust brake unit 9A to force the exhaust brake (auxiliary brake) 9 to be operated or actuated when the actual vehicle speed becomes higher than the target vehicle speed of cruise control.

With the operation of the exhaust brake control means 108, a sufficiently large braking force can be surely provided by the exhaust brake 9, even when the actual vehicle speed becomes higher than the target vehicle speed because of reduction in a normal braking force while the vehicle is running on a downhill road, for example. In this manner, the target vehicle speed set under cruise control can be suitably maintained.

In the above case, the constant-speed cruise control means 101 generates a command to the semi-automatic transmission control unit 11 to inhibit changes of the gear position of the semi-automatic transmission 3, so that the vehicle speed is not reduced by changing the gear position where the actual vehicle speed is higher than the target vehicle speed, thereby to prevent shift hunting that may otherwise occur.

The exhaust brake control means 108 determines whether the actual vehicle speed detected by the vehicle speed sensor 21 is greater than a value obtained by adding an auxiliary braking start judgement value Vsb to the target vehicle speed set by the target vehicle speed setting means 5 (actual vehicle speed>target vehicle speed+Vsb). If the actual vehicle speed is larger than the value obtained by adding the value Vsb to the target vehicle speed, the exhaust brake control means 108 generates a command to the exhaust brake unit 9A to operate or actuate the exhaust brake 9.

The semi-automatic T/M control unit 11, as shift control means, changes setting of the gear position of the semi-automatic transmission 3, in response to a gear position command signal received from the constant-speed cruise control means 101 constructed as described above. The control unit 11 then controls the clutch mechanism 2 and the semi-automatic transmission 3 through the clutch booster 2A and the gear shift unit 3A, so as to shift the transmission to the gear position thus changed.

The exhaust brake unit 9A controls the operation of the exhaust brake 9, in response to a command signal from the exhaust brake control means 108 of the constant-speed cruise control means 101. The exhaust brake 9 is also actuated in response to a signal from the exhaust brake switch 27. When the exhaust brake unit 9A receives a command signal from the exhaust brake control means 108, however, the exhaust brake 9 is caused to operate irrespective of the absence of the signal from the exhaust brake switch 27 (namely, even in the case where the driver does not choose to operate the auxiliary brake during normal running).

The constant-speed cruise control performed by the constant-speed cruise control means 101 is canceled when the cruise control set switch 5 is turned off, and when the driver steps on the footbrake or a brake pedal (not illustrated), for example.

Figure 4:
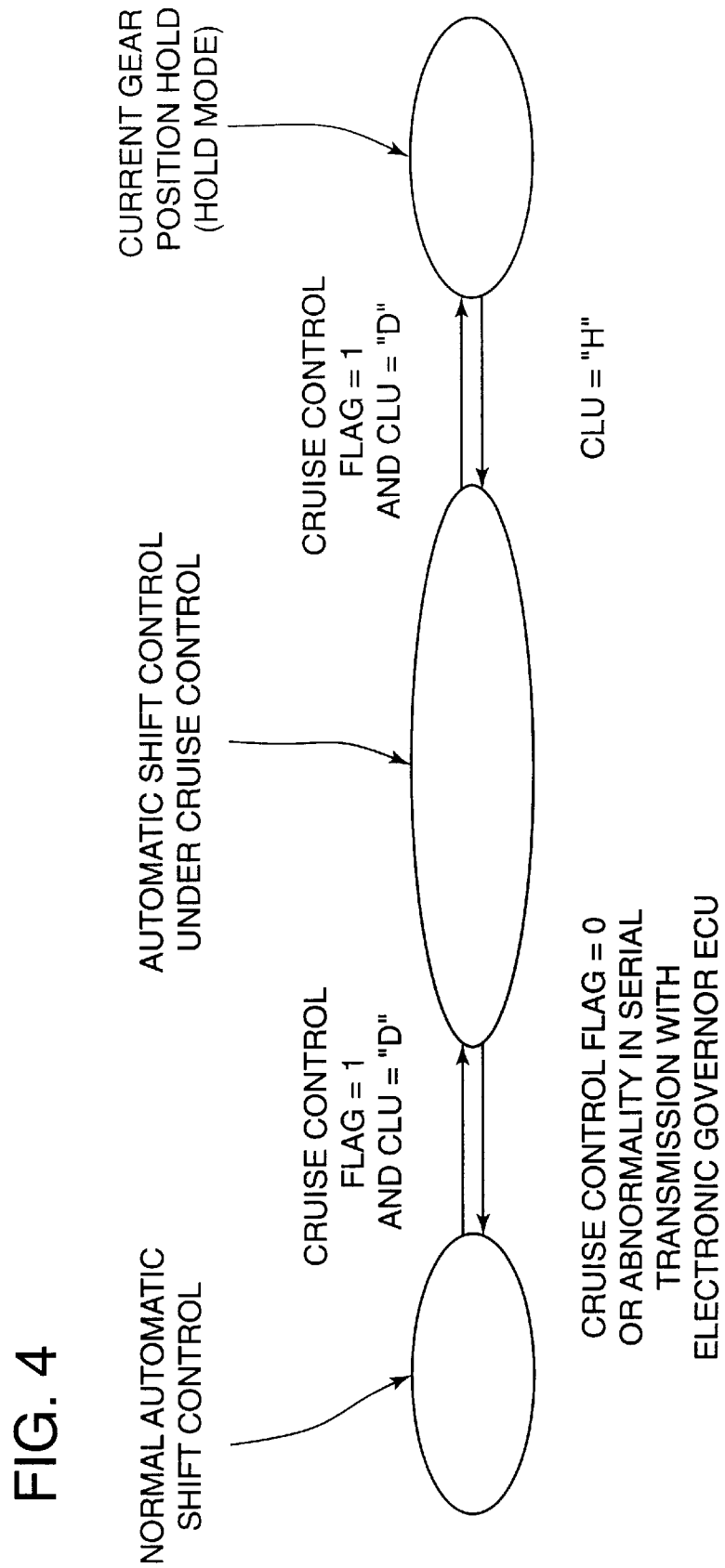
FIG. 4 is a schematic view showing a control arrangement of the vehicle cruise control system of the embodiment of FIG. 1.

The transition of shift control during cruise control takes place as shown in FIG. 4.

Initially, the transition from normal automatic shift control to automatic shift control under cruise control takes place when all of the following conditions are satisfied.

(1) A cruise control flag is 1.

The cruise control flag indicates whether the vehicle is being under cruise control or not. This flag is set to 1 while the vehicle is being under cruise control, and set to 0 while the vehicle is not under cruise control. The cruise control flag is set to 1 when the cruise control set switch 5 is turned on.

(2) The change level of the change lever unit 4 is placed in the D position.

The transition from the automatic shift control under cruise control to the current gear position hold control takes place when the following condition is satisfied.

(1) The change lever of the change lever unit 4 is placed in the H position.

The transition from the current gear position hold control to the automatic shift control under cruise control takes place when all of the following conditions are satisfied.

(1) The change lever of the change lever unit 4 is placed in the D position.

(2) The cruise control flag is 1.

The transition from the automatic shift control under cruise control to the normal automatic shift control takes place when any of the following conditions is satisfied.

(1) The cruise control flag is 0.

Here, the cruise control flag is set to 0 when the cruise control set switch 5 is turned off, or the exhaust brake switch 27, as an auxiliary brake switch, is turned on, or the footbrake (brake pedal) is depressed.

(2) An abnormality is present in serial communication between the semi-automatic transmission control unit 11 and the electronic governor control unit 12.

Figure 5:
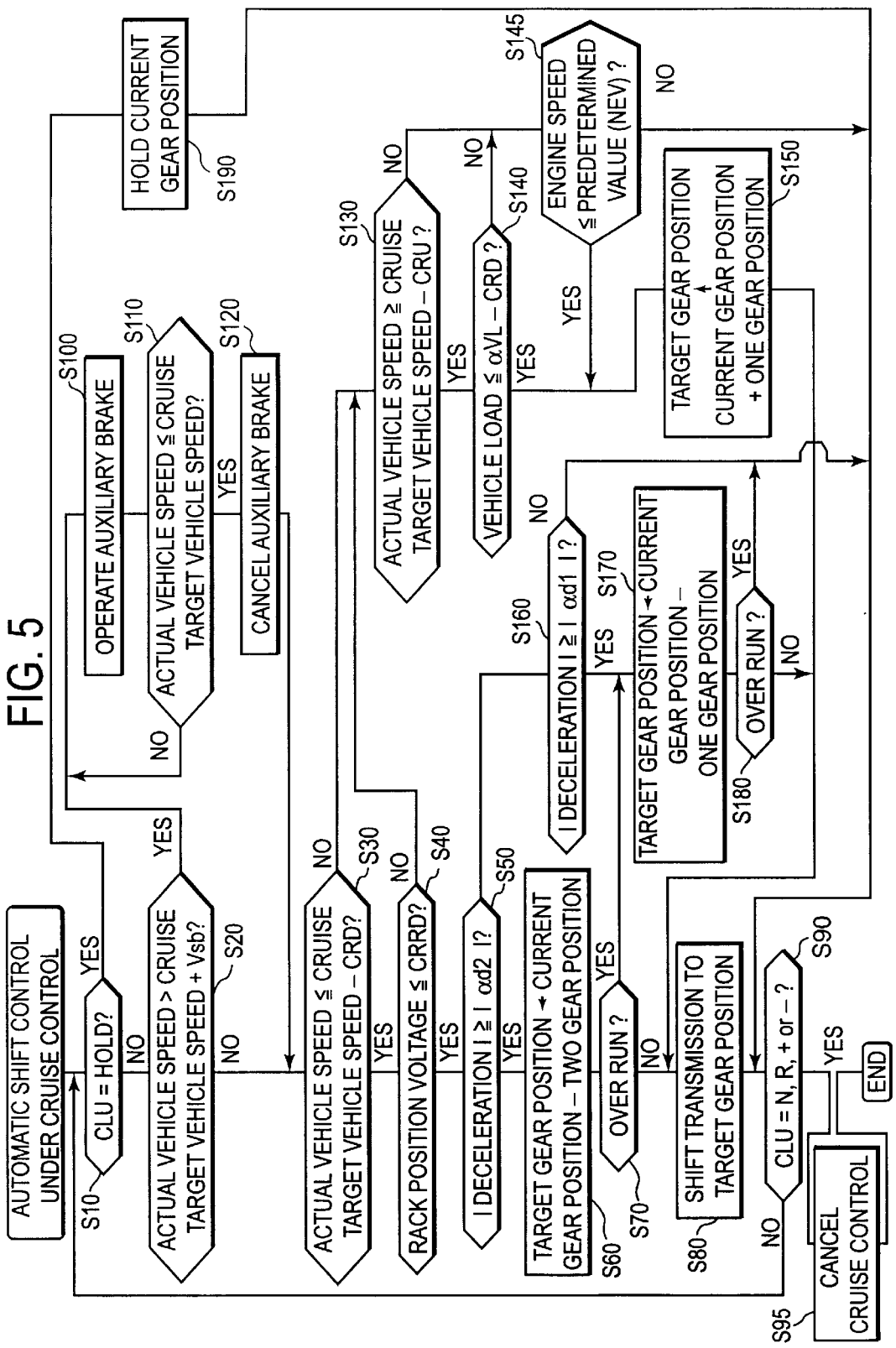
FIG. 5 is a flowchart useful in explaining the operation of the vehicle cruise control system of the embodiment of FIG. 1.

The cruise control system for a motor vehicle according to the one embodiment of the present invention is constructed, as described above, and performs cruise control or automatic speed control according to the flowchart of FIG. 5, by way of example.

In the cruise control of the present embodiment, current gear position hold control (step S10, step S190) for holding the current gear position of the semiautomatic transmission 3, control (step S20, step S100–step S120) for actuating the exhaust brake 9, select control (step S30–step S80, step S130–step S180) for selecting the gear position of the semi-automatic transmission 3, and control (step S90) for canceling cruise control through the operation of the change lever unit 4 are performed in addition to normal fuel supply control. Each of these control operations will be separately explained below.

Initially, the current gear position hold control performed by the current gear position hold control means 106 will be described.

In step S10, it is determined which of the automatic shift mode and the manual shift mode is being selected, namely, whether the change lever of the change lever unit 4 is placed in the H position (HOLD position) that establishes the manual shift mode or not. If the change lever is not placed in the H position, the vehicle operates in the automatic shift mode with the change lever placed in the D position.

If step Si0 determines that the change lever is placed in the H position, which means that the vehicle is operating in the manual shift mode, the current gear position of the semi-automatic transmission 3 is held or maintained by the current gear position hold control means 106, and cruise control is performed only by controlling the fuel supply of the electronic governor 1A through the electronic governor control unit 12.

If step S10 determines that the change lever is not placed in the H position, which means that the vehicle is operating in the automatic shift mode with the change lever placed in the D position, cruise control is performed by implementing the control for actuating the exhaust brake 9 through the exhaust brake control means 108 of the cruise control means 101, control for selecting the gear position of the semi-automatic transmission 3 through the semi-automatic transmission control unit 11, and control for canceling cruise control through the operation of the change lever unit 4.

When the actual vehicle speed becomes greater than the target vehicle speed, speed-reduction control is performed by use of the exhaust brake 9, since shift hunting is likely to occur if the vehicle speed is reduced by changing the gear position of the transmission.

In step S20, the exhaust brake means 108 of the constant-speed cruise control means 101 determines whether the actual vehicle speed detected by the vehicle speed sensor 21 is greater than a value obtained by adding a predetermined value Vsb used for judging the start of auxiliary braking, to the target vehicle speed set by the target vehicle setting means 5 in the form of the cruise control set switch 5 (actual vehicle speed>target vehicle speed+Vsb).

If the result of determination in step S20 indicates that the actual vehicle speed is greater than the value obtained by adding the predetermined value Vsb to the target value, the control flow goes to step S100 to inhibit shift control of the semi-automatic transmission 3 and actuate or operate the exhaust brake 9, and then goes to step S110.

Step S110 determines whether the actual vehicle speed is equal to or lower than the target vehicle speed. If a negative decision (NO) is obtained in step S110, namely, if the actual vehicle speed is still higher than the target vehicle speed, the control flow returns to step S100 to keep operating the exhaust brake 9 until the actual vehicle speed becomes equal to or lower than the target vehicle speed. Once the actual vehicle speed becomes equal to or lower than the target vehicle speed, the control flow proceeds to step S120 to cancel or stop the operation of the exhaust brake 9 serving as the auxiliary brake.

If the actual vehicle speed becomes lower than the target vehicle speed, on the other hand, gear change control for changing the gear position of the semi-automatic transmission 3 through the semi-automatic transmission control unit 11 is performed.

In the gear change control, constant-speed cruise control intended for recovering the drive force through downshifting is performed by executing step S30 to step S80 and step S160 to step S180, and constant-speed cruise control intended for improving the fuel efficiency through upshifting is performed by executing step S130 to step S150, and step S80.

In step S30, it is determined whether the actual vehicle speed is equal to or less than a value obtained by subtracting the predetermined value CRD from the target vehicle speed (vehicle speed≦target vehicle speed−predetermined vehicle speed CRD). If the actual vehicle speed is equal to or less than the value obtained by subtracting the predetermined value CRD from the target vehicle speed, the control flow goes to step S40 in which the downshift determining means 105A determines whether the rack position voltage is equal to or lower than a predetermined voltage CRRD or not, so that downshifting takes place when the rack position voltage is low, namely, when the electronic governor 1A is able to inject a sufficiently large amount of fuel.

If the result of determination of step S40 indicates that the rack position voltage is equal to or lower than the predetermined voltage CRRD, namely, the amount of fuel injection is equal to or larger than a predetermined value, step S50 to step S80, and step S160 to step S180 are executed so as to enable the shift level setting means 105B to set a downshift level by which the transmission is to be shifted down.

Specifically, step S50 is executed to determine whether the magnitude of the current deceleration of the vehicle is equal to or greater than that of a predetermined deceleration αd2 (|deceleration|≧|predetermined deceleration αd2|). If step S50 determines that the magnitude of the deceleration is equal to or greater than the predetermined deceleration αd2, the control flow goes to step S60 so as to set the target gear position to a gear position that is two shift levels (corresponding to two gear positions) lower than the current gear position.

Step S70 is, then, executed to determine whether there is a possibility of over run (excessively high-speed rotation) of the engine if the transmission downshifts by two shift levels from the current gear position. If there is no possibility of the over run, step S80 is then executed to cause the semi-automatic transmission control unit 11 to shift the semi-automatic transmission 3 to the target gear position.

If there is a possibility of over run of the engine, on the other hand, step S170 is executed to set the target gear position to a gear position one shift level lower than the current gear, and step S180 is then executed to determine whether there is a possibility of the over run if the transmission downshifts by one shift level from the current gear position.

If step S180 determines that there is no possibility of the over run, the control flow goes to step S80 to allow the semi-automatic transmission 3 to shift the semi-automatic transmission 3 to the target gear position. If there is a possibility of the over run, on the other hand, the current gear position is not changed, but maintained.

If step S50 determines that the magnitude of the current deceleration of the vehicle is smaller than that of the predetermined deceleration αd2, the control flow goes to step S160 to determine whether the magnitude of the deceleration is equal to or greater than that of the predetermined deceleration αd1 (|deceleration|≧|predetermined deceleration αd1). If step S160 determines that the magnitude of the deceleration is equal to or greater than the predetermined deceleration αd1, step S170 is executed to set the target gear to a gear position one shift level lower than the current gear position, and the control flow goes to step S180.

In step S180, it is determined whether there is a possibility that the over run (excessively high-speed rotation) of the engine occurs if the transmission is shifted down by one shift level from the current gear position. If there is no possibility of the over run, step S80 is then executed to cause the semi-automatic transmission control unit 11 to shift the semi-automatic transmission 3 to the target gear position. If there is a possibility of the over run, on the other hand, the current gear position is not changed, but maintained.

In the case where step S30 determines that the actual vehicle speed is not equal to nor lower than the value obtained by subtracting the predetermined vehicle speed CRD from the target vehicle speed, and the case where step S40 determines that the rack position voltage is not equal to nor lower than the predetermined voltage CRRD, upshift control, as described below, is performed to achieve a high fuel efficiency.

Step S130 is initially executed to determine whether the actual vehicle speed is equal to or higher than a value obtained by subtracting the predetermined vehicle speed CRU from the target vehicle speed.

If step S130 determines that the actual vehicle speed is equal to or higher than the value resulting from subtraction of the predetermined vehicle speed CRU from the target vehicle speed, step S140 is executed to determine whether the vehicle load is equal to or smaller than $\alpha_{VL}$ or not. If the vehicle load is equal to or smaller than $\alpha_{VL}$, the target gear position is set to a gear position one shift level higher than the current gear, and step S80 is then executed to shift up the semiautomatic transmission 3 to the target gear position.

In step S145, it is determined whether the engine speed is equal to or higher than a predetermined value (NEV) or not. If the engine speed is equal to or higher than the specified value (NEV), step S150 is executed to set the target gear position to a gear position one shift level higher than the current gear position, and step S80 is then executed to shift up the semi-automatic transmission 3 to the target gear position.

The constant-speed cruise control or automatic speed control may be performed through any of the following control operations, i.e., control of the operation of the exhaust brake 9, gear change control for changing the gear position of the semi-automatic transmission 3, and control of the fuel supply of the electronic governor 1A. No matter what type of control(s) is used, the constant-speed cruise control may be canceled by the canceling means 107 only by changing the gear position of the transmission so as to reduce the vehicle speed due to an effect of an engine brake, even if a normal canceling procedure, such as depression of the brake pedal, is not carried out for cancellation of the constant-speed cruise control.

More specifically, after executing step S80, step S130, step S140, step S145, step S160, step S180, and step S190, the control flow goes to step S90 in which the canceling means 107 determines whether the change lever of the change lever unit 4 is placed in any of the N position, R position, +position, and the −position.

If the result of determination in step S90 indicates that the change lever is placed in one of the above-indicated positions, the canceling means 107 cancels the constant-speed cruise control, in step S95, performed by the constant-speed cruise control means 101.

If the change lever is not placed in any of the above-indicated positions, namely, the change lever is placed in the D position or H position, the control flow returns to step S10, and step S10 through step S80 and step S100 through step S190 are executed to continue the constant-speed cruise control by performing the control of the operation of the exhaust brake 9, change gear control of the gear position of the semi-automatic transmission 3, and the fuel supply control of the electronic governor 1A.

The vehicle cruise control system of the present embodiment performs constant-speed cruise control in the manner as described above. The present cruise control system is characterized in that when the current gear position hold control means 106 determines that cruise control should not be carried out by the gear change control of the transmission, the current gear position is held or maintained, and cruise control is performed only though the fuel supply control of the electronic governor 1A. The present cruise control system is also characterized in that when the canceling means 107 determines that the change lever of the change lever unit 4 is operated to any one of the N position, R position, +position, and the −position, (namely, when the change lever is not placed in the D position nor H position), the constant-speed cruise control or automatic speed control by the constant-speed cruise control means 101 is canceled.

The current gear position hold control means 106 determines whether the change lever of the change lever unit 4 is placed in the H position corresponding to the manual shift mode, or the D position corresponding to the automatic shift mode, and when the change lever of the change lever unit 3 is placed in the H position, the gear change control is not performed, and the transmission is kept in the current gear position, while cruise control is performed only by utilizing the fuel supply control of the electronic governor 1A through the electronic governor control unit 12.

The canceling means 107 determines whether the change lever of the change lever unit 3 is operated to any of the N position, R position, +position, and the −position. If the change lever is operated to one of these positions, the constant-speed cruise control by the cruise control means 101 is canceled.

In the vehicle cruise control system of the present embodiment, therefore, the constant-speed cruise control by the constant-speed cruise control means 101 can be canceled when the driver manipulates the change lever of the change lever unit 4 to establish the manual shift mode, so as to change the gear position by a suitable shifting operation. Thus, the gear position of the transmission is changed according to the shifting operation performed on the change lever of the change lever unit 4, so that the vehicle speed can be controlled as desired according to the driver's intention.

Namely, the above-described arrangement makes it possible to select one of the cruise control achieved only by fuel supply control of the electronic governor 1A through the electronic governor control unit 12, and the cruise control achieved by the fuel supply control and the gear change control of the gear position of the semiautomatic transmission through the semi-automatic transmission control unit 11, depending upon whether the driver operates the change lever of the change lever unit 4 to the H position or the D position. Accordingly, the gear change control of the gear position of the transmission may be selectively used for accomplishing the cruise control, depending upon the driver's preference.

With the above arrangement, where the vehicle is decelerated from high-speed running, the constant-speed cruise control is canceled by the canceling means 107, only by shifting down the transmission without using the footbrake or brake pedal, so that the vehicle speed can be reduced due to an effect of the engine brake.

While the auxiliary brake is provided by the exhaust brake in the vehicle cruise control system of the present embodiment, an auxiliary engine brake for releasing the pressure during a compression stroke or a retarder may be employed as the auxiliary brake.

In the vehicle cruise control system of the present embodiment, constant-speed cruise control is performed by selectively performing all of the upshift control by the upshift control means 104, downshift control by the downshift control means 105, current gear position hold control by the current gear position hold control means 106, canceling control of the constant-speed cruise control by the canceling means 107, and the control of the operation of the exhaust brake by the exhaust brake control means 108. It is, however, possible to perform only the canceling control of the constant-speed cruise control by the canceling means 107, without performing the upshift control by the upshift control means 104, downshift control by the downshift control means 105, current gear hold control by the current gear hold control means 106, and the control of the operation of the exhaust brake by the exhaust brake control means 108.

In the vehicle cruise control system of the present embodiment, the H position (hold position) is provided for establishing the manual shift mode, and the gear position of the transmission is inhibited from shifting while the change lever is placed in the H position. The H position, however, is not required to be provided to practice the present invention.

The transmission to which the vehicle cruise control system of the present embodiment is applied is not limited to the semi-automatic transmission, as described above, but the present cruise control system may be equally applicable to a fully automatic transmission that is not equipped with a clutch pedal and also to an automatic transmission having a planetary gear system.

It is also possible to easily practice the present invention when the cruise control system is used with an automatic transmission equipped with a shift lever that is placed in a selected one of P (Park) position, R (reverse) position, N (Neutral) position, D (Drive) position, 2 (Second) position, and L (Low) position. In this case, the cruise control system is constructed such that its operation is canceled or stopped when the shift lever is manually operated from the D position to the 2 (Second) position or L position during constant-speed cruise control by the cruise control system.

The shift manipulating device of the present invention is not limited to the change lever or shift lever as described above. In an automatic transmission equipped with an OD switch for turning on or off the OD (Over Drive) mechanism of the transmission, the operation of the cruise control system may be canceled by operating the OD switch during constant-speed running of the vehicle, so as to easily practice the present invention.

While the illustrated embodiment is concerned with a motor vehicle including a diesel engine, it is apparent that the present invention is equally applicable to vehicles having gasoline engines.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor vehicle, comprising:
   shift manipulating means for establishing a selected one of an automatic shift mode in which an optimum gear position of an automatic transmission is automatically set based on a running condition of the vehicle, and a manual shift mode in which a gear position of the automatic transmission is changed according to a shift command operation of a driver;
   shift control means for changing the gear position of the automatic transmission based on an operated state of said shift manipulating means;
   target speed setting means for setting a target vehicle speed to which a vehicle speed is controlled under constant-speed cruise control;
   actual vehicle speed detecting means for detecting an actual vehicle speed of the motor vehicle;
   constant-speed cruise control means for controlling an engine of the vehicle so that the actual vehicle speed detected by said actual vehicle speed setting means becomes equal to the target vehicle speed set by said target vehicle speed setting means; and
   canceling means for canceling an operation of said constant-speed cruise control means when said shift manipulating means is operated to switch from the automatic shift mode to the manual shift mode, and the shift command operation is performed by the driver, while the vehicle is running under constant-speed cruise control by the constant-speed cruise control means,
   wherein said shift manipulating means has a hold position for holding a gear position in which the transmission is placed at a point of time when the shift manipulating means is operated to the hold position to establish the manual shift mode, and
   wherein said shift control means inhibits a change of the gear position and causes the constant-speed cruise control means to continue constant-speed cruise control, when said shift manipulating means is operated to switch from the automatic shift mode to the manual shift mode, and is placed in said hold position after switching.

2. A motor vehicle as defined in claim 1, wherein said constant-speed cruise control means controls an amount of a fuel injected into the engine to perform the constant-speed cruise control.

3. A motor vehicle as defined in claim 1, wherein said constant-speed cruise control means controls an amount of intake air of the engine to perform the constant-speed cruise control.

4. A motor vehicle as defined in claim 1, wherein said constant-speed cruise control means sets a target gear position to an optimum gear position that is most suitable for controlling the vehicle speed so that the actual vehicle speed detected by said actual vehicle speed detecting means becomes equal to the target vehicle speed set by the target vehicle speed setting means, and
   wherein said shift control means changes the gear position of the automatic transmission to the target gear position set by said constant-speed cruise control means while the vehicle is running under the constant-speed cruise control.

5. A motor vehicle according to claim 1, wherein said constant-speed cruise control means controls the actual vehicle speed to match the target vehicle speed by controlling an output of and engine and permitting the automatic transmission to automatically shift to the optimum gear position, when the transmission is in the automatic shift mode.

6. A motor vehicle according to claim 1, wherein said constant-speed cruise control means controls the actual vehicle speed to match the target vehicle speed by controlling only an output of an engine, after the automatic transmission is shifted from the automatic shift mode to the manual shift mode, until the automatic transmission is manually shifted to a desired gear position by an operation of the shift manipulating means.

7. A motor vehicle according to claim 1, further comprising:
   an auxiliary braking device,
   wherein said braking device is operated to reduce the actual vehicle speed of the motor vehicle when the actual speed exceeds the target vehicle speed.

8. A motor vehicle according to claim 7, wherein said auxiliary braking device is an exhaust brake unit.

9. A motor vehicle, comprising:
   an automatic transmission including a shift manipulating device having an automatic shift position and a manual shift position, and a shift control device which places the automatic transmission in an optimum gear position when the shift manipulating device is operated to the automatic shift position, said optimum gear position being selected from a plurality of gear positions, according to an operated state of an accelerator pedal by a driver and a running condition of the vehicle, said shift control device placing the automatic transmission in a desired gear position according to a shift command operation by a driver when the shift manipulating device is operated to the manual shift position;
   a target speed setting device which sets a target vehicle speed to which a vehicle speed is controlled under constant-speed cruise control;
   a vehicle speed sensor which detects a vehicle speed of the motor vehicle;
   a constant-speed cruise control device which controls an engine of the vehicle so that the vehicle speed detected by said vehicle speed sensor becomes equal to the target vehicle speed set by said target vehicle speed setting device; and
   a canceling device which cancels an operation of said constant-speed cruise control device when said shift manipulating device is operated from the automatic shift position to the manual shift position, and the transmission is shifted to a gear position different from a current gear position, while the vehicle is running under constant-speed cruise control by said constant-speed cruise control means, wherein said constant-speed cruise control device controls said shift control device so that the optimum gear position is selected from the plurality of gear positions, based on at least the target vehicle speed set by said target vehicle speed setting device, and the vehicle speed detected by said vehicle speed sensor, wherein said shift manipulating device has a hold position for holding a current gear position of the automatic transmission, wherein said shift control device controls the automatic transmission to hold a gear position in which the transmission is placed at a point of time when the shift manipulating device is operated to the hold position, and wherein said shift control device inhibits a change of the gear position, and the constant-speed cruise control device maintains the constant-speed cruise control, when said shift manipulating device is operated to said hold position while the vehicle is running under constant-speed cruise control by the constant-speed cruise control device.

10. A motor vehicle according to claim 9, wherein said constant-speed cruise control device controls the actual vehicle speed to match the target vehicle speed by controlling an output of and engine and permitting the automatic transmission to automatically shift to the optimum gear position, when the transmission is in the automatic shift mode.

11. A motor vehicle according to claim 9, wherein said constant-speed cruise control unit controls the actual vehicle speed to match the target vehicle speed by controlling only an output of an engine, after the automatic transmission is shifted from the automatic shift mode to the manual shift mode, until the automatic transmission is manually shifted to a desired gear position by an operation of the shift manipulating device.

12. A cruise control system for a vehicle, the vehicle having a transmission including an automatic shift mode in which the transmission is automatically shifted to an optimal gear position based on a running condition of the vehicle, and a manual shift mode in which the transmission is shifted to a desired gear position by manually operating a shift manipulating device, comprising:

a cruise control unit which controls an actual vehicle speed to match a target vehicle speed; and a canceling unit which cancels an operation of said cruise control unit when the transmission is manually shifted to the desired gear position by an operation of the shift manipulating device when the transmission is in the manual shift mode, wherein said shift manipulating device has a hold position for holding a current gear position of the transmission when the transmission is in the manual shift mode, wherein the constant-speed cruise control device maintains the constant-speed cruise control, when said shift manipulating device is in said hold position, and wherein said cruise control unit controls the actual vehicle speed to match the target vehicle speed by controlling only an output of an engine, after the transmission is shifted from the automatic shift mode to the manual shift mode, until the transmission is manually shifted to the desired gear position by an operation of the shift manipulating device.

13. A motor vehicle, comprising:

a shift manipulating unit arranged to establish a selected one of an automatic shift mode in which an optimum gear position of an automatic transmission is automatically set based on a running condition of the vehicle, and a manual shift mode in which a gear position of the automatic transmission is changed according to a shift command operation of a driver, said shift manipulating unit having a hold position for holding a gear position in which the transmission is placed at a point of time when the shift manipulating unit is switched to the hold position to establish the manual shift mode;

a shift control unit arranged to change the gear position of the automatic transmission based on an operated state of said shift manipulating unit;

a target speed setting unit arranged to set a target vehicle speed to which a vehicle speed is controlled under constant-speed cruise control;

an actual vehicle speed detecting unit arranged to detect an actual vehicle speed of the motor vehicle;

a constant-speed cruise control unit to control an engine of the vehicle so that the actual vehicle speed detected by said actual vehicle speed setting unit becomes equal to the target vehicle speed set by said target vehicle speed setting unit; and a control unit arranged to maintain an operation of said constant-speed cruise control unit when said shift manipulating unit is switched from the automatic shift mode to the manual shift mode, and cancel the operation of said constant-speed cruise control unit when said shift manipulating unit is operated from said hold position to manually change the gear position of the automatic transmission.

* * * * *